United States Patent [19]
Morimoto et al.

[11] Patent Number: 4,789,500
[45] Date of Patent: Dec. 6, 1988

[54] OPTICAL CONTROL ELEMENT

[75] Inventors: Kiyoshi Morimoto, Mobara; Toshinori Takagi, Nagaokakyo; Kakuei Matsubara, Hirakata, all of Japan

[73] Assignee: Futaba Denshi Kogyo Kabushiki Kaisha, Mobara, Japan

[21] Appl. No.: 845,531

[22] Filed: Mar. 28, 1986

[30] Foreign Application Priority Data

Mar. 28, 1985 [JP] Japan .................. 60-064851

[51] Int. Cl.$^4$ .................................... G02B 5/20
[52] U.S. Cl. .................... 252/584; 252/582; 350/355
[58] Field of Search .......... 350/355; 252/600, 582, 252/584; 420/525, 579, 434

[56] References Cited

U.S. PATENT DOCUMENTS

| 2,890,260 | 6/1959 | Fredrick | 420/579 |
| 3,516,728 | 6/1970 | Fenner | 350/355 |
| 4,626,296 | 12/1986 | Haushalter | 420/579 |

FOREIGN PATENT DOCUMENTS

| 127884 | 7/1984 | Japan | 420/525 |
| 656486 | 6/1987 | Sweden | 420/579 |

OTHER PUBLICATIONS

Sondermann "Magnetic Investigations . . . ", Jour. of Magnetism and Magnetic Materials 2 (1976) 216-222.
Wei, et al, "Alloy-Stabilized . . . ", Phys. Rev. Lett. 56(22), June 2, 1986.

Primary Examiner—Matthew A. Thexton
Assistant Examiner—Catherine S. Kilby
Attorney, Agent, or Firm—Oblon, Fisher, Spivak, McClelland & Maier

[57] ABSTRACT

An optical control element is disclosed which is capable of accomplishing the simplifying, small-sizing and lightening of the structure. The optical control element comprises a substrate exhibiting both an optical function and a magnetic function and a $Cd_{1-x}Mn_xTe$ directly deposited on the substrate.

6 Claims, 4 Drawing Sheets

OPTICAL CONTROL ELEMENT

BACKGROUND OF THE INVENTION

1. Field of the Invention

This invention relates to an optical control element for use in an optical isolator, an optical switch, a light modulator and the like, and more particularly to an optical control element using (Cd, Mn)Te which is a ternary compound consisting of CdTe and MnTe.

2. Description of the Prior Art

In the art of optical data processing, optical communication or the like, various techniques which utilize a material exhibiting magneto-optical effects have been proposed to carry out the time and space control of a light wave transmitted on a waveguide path.

Among the magneto-optical effects, a Faraday effect is known as a phenomenon of causing a transparent magnetic material placed in a magnetic field to exhibit optical activity, wherein the direction of rotary polarization of the material is determined depending upon only the direction of magnetization of the magnetic material irrespective of the direction of propagation thereof. Thus, the reciprocated passage of a light in a waveguide system constituted by a material having a Faraday effect causes its rotation to be doubled.

Such a Faraday effect is advantageously utilized in an optical isolator for, for example, optical communication, an optical disc or the like which uses a semiconductor laser as its light source. The semiconductor laser has a disadvantage of readily exhibiting such a return light phenomenon that a light which has been reflected on the end surface of an optical connector or the like enters the semiconductor again, as compared with a gas laser or the like, to thereby render the oscillation of the laser unstable. In order to accomplish the positive blocking of such return light and ensure the stable laser oscillation, an optical isolator as shown in FIG. 7 has been proposed which uses a Faraday effect element.

More particularly, an optical isolator shown in FIG. 7 is constructed in such a manner that the plane of polarization of a laser beam L1 which has been subjected to linear polarization through a polarizer 1 is rotated by means of a Faraday rotor 2. A rotational angle of the polarization plane is determined depending upon the intensity H of a magnetic field and the length of the Faraday rotor 2. When the length of the rotor 2 is determined to cause the rotational angle to be set at 45 degrees, the polarized laser beam L1 is transmitted through an analyzer 3 rearwardly arranged and having a polarization angle of 45 degrees and delivered to the next step. On the other hand, reflected light L2 is subjected to Faraday rotation of which an angle is 45 degrees by means of the Faraday rotor 3. Thus, it is fully interrupted by the polarizer 1 and prevented from entering a laser source (not shown) in the form of a return light.

An optical isolator for an optical communication system using such a semiconductor laser which has been known in the art typically uses a solid YIG monocrystal material. Accordingly, the optical isolator has a disadvantage of being highly expensive because the YIG monocrystal itself is costly. Also, it has another disadvantage that it is rendered large in size.

An optical isolator may be evaluated with, for example, a performance index $2\theta F/\alpha$, wherein $\theta F$ is Faraday rotation and $\alpha$ is a light absorption coefficient. It is known in the art that garnet monocrystal $Gd_{3-x}Bi_x$-$Fe_5O_{12}$ ($x=1.5$) replaced with Bi has a performance index as large as $2°-30°/dB$. Nevertheless, a high performance optical isolator is desired which has a performance index exceeding $45°/dB$. For this purpose, it is desired to develop a magneto-optical element of a large performance index.

Recently, much attention has been devoted to a ternary compound CdMnTe consisting of CdTe and MnTe, because it is supposed to exhibit both ordinary semiconductive properties and magnetic properties. The compound has a zincblende structure as seen in CdTe. It exhibits properties of II-IV group compound semiconductors in the absence of a magnetic field. When it is placed in a magnetic, Faraday rotation is substantially obtained at a room temperature due to the interaction between 3d localized electrons of $M^{2+}$ and charge carriers. However, the CdMnTe compound semiconductor now available is only in the form of a solid polycrystal.

SUMMARY OF THE INVENTION

The present invention has been made in view of the foregoing disadvantage of the prior art.

Accordingly, it is an object of the present invention to provide an optical control element which is capable of accomplishing simplifying, small-sizing and lightening of the structure.

It is another object of the present invention to provide an optical control element which is capable of being effectively used for a light communication system, an optical data processing system and the like.

In accordance with the present invention, there is provided an optical control element which comprises a substrate and a film of $CD_{1-x}Mn_xTe$ ($0.01 \leq x \leq 0.99$) formed directly on the substrate.

In the present invention, the substrate may comprise a polarizing plate or reflecting mirror. Alternatively, it may be formed of a light-permeable material.

Also, in accordance with the present invention, there is provided an optical control element which comprises a substrate and a plurality of multilayered $Cd_{1-x}Mn_xTe$ ($0.01 \leq x \leq 0.99$) films formed on the substrate, wherein the x values in the respective films are different from one another.

Further, in accordance with the present invention, there is provided an optical control element which comprises a substrate and a plurality of $Cd_{1-x}Mn_xTe$ ($0.01 \leq x \leq 0.99$) films planely arranged on the substrate, wherein the x values in the respective films are different from one another.

Thus, the optical control element of the present invention is constructed to deposit a CdMnTe ternary compound film accomplishing the Faraday rotation of a light directly on a substrate exhibiting an optical and/or magnetic function so that the plane of polarization of a light which passes through the substrate and enters the film exhibiting a magneto-optical effect may be subjected to Faraday rotation.

Accordingly, the optical control device of the present invention can separate an incident light and a reflected light from each other and act as an optical switch. Also, the element of the present invention may be constructed in a manner such that the magneto-optical effect film is deposited on the surface of a mirror or the like to cause an incident light to enter the element from the film side. Because of this construction a highly large polarization angle can be obtained, and the structure can be highly simplified, small-sized and thin-walled, which is effectively used for an optical isolator, an optical switch, a light modulator and the like.

BRIEF DESCRIPTION OF THE DRAWINGS

These and other objects and many of the attendant advantages of the invention will be readily appreciated as the same becomes better understood by reference to the following detailed description when considered in connection with the accompanying drawings in which like reference characters designate like or corresponding parts throughout; wherein.

DETAILED DESCRIPTION OF THE PREFERRED EMBODIMENTS

Now, an optical control element according to the present invention will be described hereinafter with reference to FIGS. 1 to 6.

First, a process for preparing an optical control element of the present invention will be described.

As described above, a CdMnTe compound available at present is only in the form of a solid polycrystal and a CdMnTe compound in the form of crystal sufficient to provide a film which is capable of being used as an optical control element has not yet been produced.

As a result of making much effort to develop a CdMnTe compound in the form of a film crystal in view of such situations, the inventors has found that a CdMnTe film of satisfied quality can be obtained using ionized-cluster beam (hereinafter referred to as "ICB") deposition techniques when conditions for the deposition are suitably determined.

The ICB deposition is a film deposition adapted to form atom aggregates or clusters in a vacuum atmosphere and then ionize and accelerate the clusters to impart kinetic energy to the clusters, to thereby deposit clusters in the form of a film on a substrate.

Figure 2:
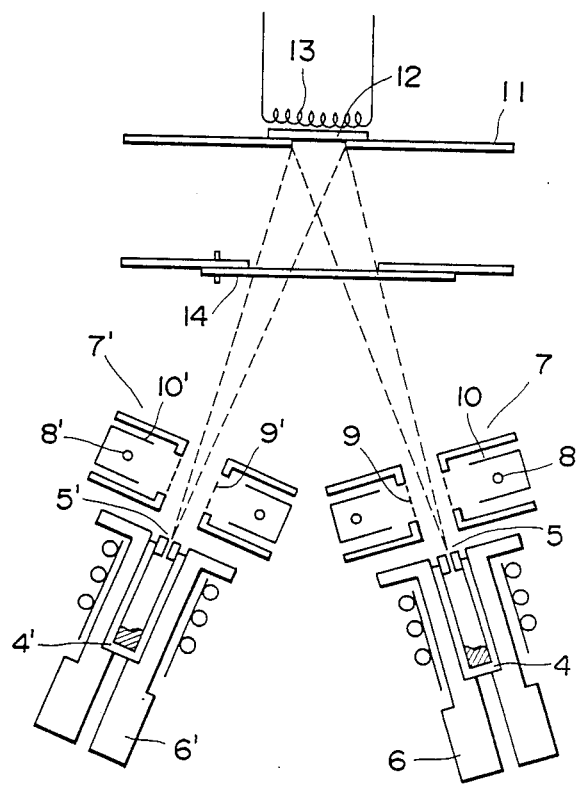
FIG. 2 is a schematic view showing an ionized-cluster beam deposition apparatus.

FIG. 2 shows a general construction of a typical ICB deposition apparatus which is used for the preparation of a magneto-optical film element of the present invention.

In FIG. 2, reference numerals 4 and 4' designate crucibles charged with CdTe and MnTe which are components of a ternary compound CdMnTe to be formed. The crucibles 4 and 4' are provided with nozzles 5 and 5', respectively, which are adapted to eject vapors of CdTe and MnTe formed in the crucibles therethrough into a high vacuum atmosphere. Reference numerals 6 and 6' indicate heating means formed of a resistive material such as carbon or the like to generate heat by means of an electrical current flowing therethrough to heat the crucibles 4 and 4', respectively. The vapors of CdTe and MnTe ejected from the nozzles 5 and 5' are subjected to a supercooled state due to adiabatic expansion at the time of the ejection to form clusters, which are then ionized in ionization chambers 7 and 7'. The ionization chambers 7 and 7' include ionization filaments 8 and 8' for emitting ionization electrons therefrom, ionization electrodes 9 and 9' applied thereto ionization voltage to draw out the ionization electrons, and shielding electrodes 10 and 10'.

Reference numeral 11 designates an acceleration electrode for applying high voltage between the crucibles 4 and 4', which also serves as a substrate holder for holding thereon a substrate 12 such as an analyzer, a polarizer, a magnetic film or the like. The substrate 12 is heated by means of a heater 13 as required. The substrate 12 is blocked from the deposition of clusters by means of a shutter 14 when it is not required.

The ICB deposition apparatus described above is arranged in a vacuum vessel and predetermined voltage is applied to each of the parts from a power source (not shown).

Pressure in the vacuum vessel is set to be as low as $1/10^2$, preferably, $1/10^4$ of that of vapor in the crucibles 4 and 4' so that at least a part of the vapor stream ejected from the nozzles 5 and 5' may form clusters.

The ICB deposition permits the formation of a film which has crystallographically satisfied quality, is adhered to a substrate with high strength and has a substantially flat surface. This is because the ICB deposition exhibits a surface migration effect that formed clusters are separated into individual molecules and atoms to be diffused on the surface of a substrate when the clusters impinge on the substrate, an effect of causing ions contained in clusters, molecules and/or atoms to effectively act on the formation and growth of nuclei and aggregation thereof during the initial stage in the formation of a film, a surface cleaning effect due to kinetic energy of the vapor stream, ion implantation effect and the like.

Also, the ICB deposition has another advantage capable of controlling the composition of a compound and the properties of a film to be formed as desired, because the heating temperature of the crucibles 4 and 4' and the ionization in the ionization chambers 7 and 7' can be varied within a wide range.

These advantages of the ICB deposition can be effectively exhibited in the formation of a CdMnTe ternary compound film for an optical control element of the present invention as well.

Figure 3:
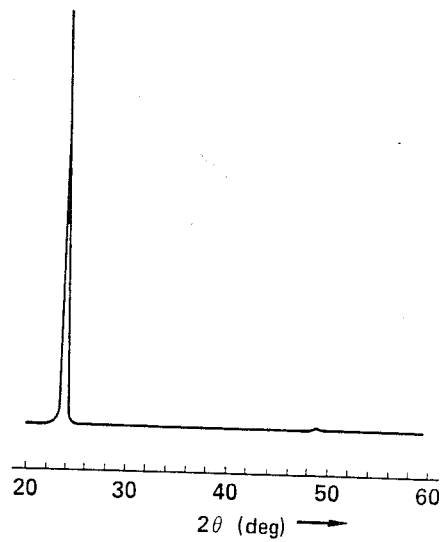
FIG. 3 is an X-ray diffraction pattern.

This is evident from FIG. 3 showing an X-ray diffraction pattern of an example of such a CdMnTe film. The film is prepared by charging the crucibles 4 and 4' with CdTe (purity: 99.99%) and MnTe (purity: 99.99%), respectively, heating the crucibles 4 and 4' at 640°–850° C. and 1150°–1250° C., respectively, ionizing only CdTe clusters with an ionization current Ie of 100 mA, and depositing them on a glass substrate at an acceleration voltage Va of 7 kV and a substrate temperature Ts of 300° C.

As is apparent from FIG. 3, the (111) axis of a zinc-blende structure is preferentially orientated in the direction perpendicular to the substrate. This reveals that the obtained CdMnTe film has a good crystallizability.

Now, the Faraday rotation spectra of the CdMnTe film formed by the ICB deposition will be described.

Figure 4:
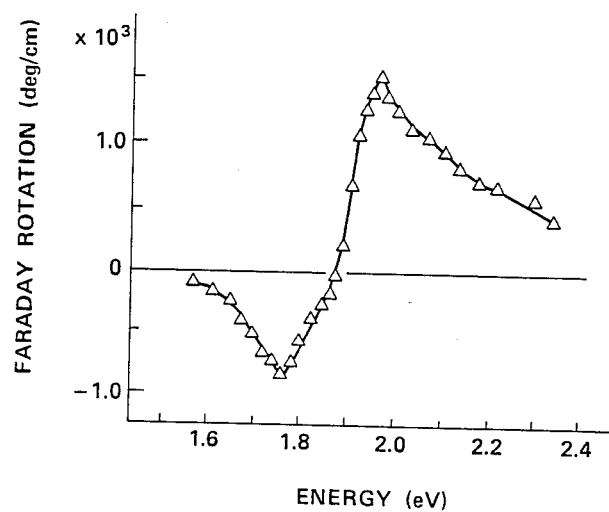
FIG. 4 is a graphical representation showing the dispersion spectra of Faraday rotation.

The Faraday rotation by the CdMnTe film is varied depending upon a value of a composition ratio x in a composition represented by $Cd_{1-x}Mn_xTe$. Also, it is varied depending upon the acceleration voltage and ionization during the formation of the film. FIG. 4 shows the dispersion spectra of Faraday rotation of a $Cd_{1-x}Mn_xTe$ film (x=0.75) deposited on a glass substrate under the above-described conditions or while keeping the acceleration voltage Va, ionization current Ie and substrate temperature Ts at 7 kV, 100 mA and 200° C., respectively, when only CdTe clusters are ionized. A magnetic field applied is 5 kOe.

In FIG. 4, the axis of abscissas indicates an energy of an incident light and the axis of ordinates indicates a Faraday rotation (deg/cm).

As shown in FIG. 4, a huge Faraday rotation above 1000 degrees is observed when the energy of an incident light is about 2.0 eV (corresponding to a light having a wavelength of 620 nm). This will render the preparation of an optical control element with satisfied performance possible.

Figure 1:
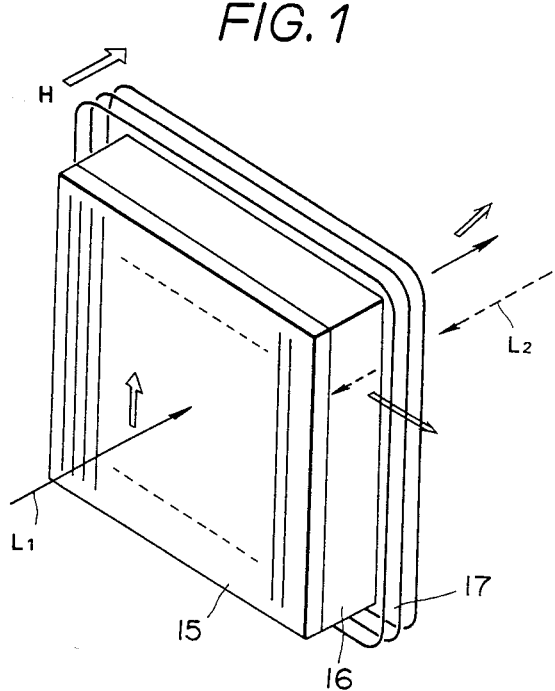
FIG. 1 is a perspective view showing an embodiment of an optical control element according to the present invention.

FIG. 1 shows an embodiment of an optical control element according to the present invention.

In FIG. 1, reference numeral 15 designates a polarizer, which may be formed of calcite or mica. Also, an artificial polarizing plate made by stretching polyvinyl alcohol film may be used as the polarizer 15. Alternatively, it may be formed of a plastic polymer film or the like. Reference numeral 16 indicates a CdMnTe film which is grown on the polarizer 15 positioned on the acceleration electrode 11 of the ICB deposition apparatus shown in FIG. 2 also acting as the substrate holder. The ICB deposition accomplishes the formation of a CdMnTe film on a plastic polymer film, because it, as described above, allows a crystalline plate of good quality to be obtained at a lower substrate temperature. Reference numeral 17 indicates a coil for imparting a magnetic field H to the magneto-optical film.

When an incident light L1 enters the optical control element constructed as described above in the direction indicated by an arrow, it is polarized directly by the polarizer 15 and then a plane of polarization thereof is rotated depending upon the intensity of the magnetic field H and the thickness of the CdMnTe film 16.

The polarized light is reflected in a waveguide path. When the reflected light L2 enters CdMnTe film 16 again, it is further subjected to Faraday rotation in the same direction as indicated by dotted lines in FIG. 2, resulting in the Faraday rotation of the light entering the polarizer 15 being doubled and the light being fully interrupted by the polarizer 15. Thus, it will be noted that the present invention can provide a small-sized and thin-walled optical isolator of a simplified structure and high performance which is suitable for use, for example, in a light communication system using a semiconductor laser.

The embodiment shown in FIG. 1 is constructed to cause a light to enter the optical control element from the polarizer side acting as a substrate. However, it may be modified to enter a light from the CdMnTe film side so that a light subjected to linear polarization may enter the optical control element therefrom. This construction allows the polarizer 15 to act as an analyzer, and the optical control element exhibits the function of an optical isolator on the analyzer side.

The deposition of the CdMnTe film on a reflecting surface provides a polarizing plate which carries out the highly large Faraday rotation.

Figure 5:
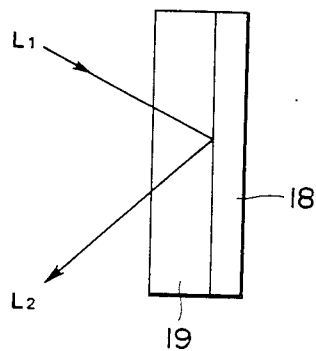
FIG. 5 is a side elevation view showing a polarizing plate constructed in accordance with the present invention.

More particularly, a CdMnTe film 19 may be deposited on, for example, on the surface of a reflecting metal mirror 18, as shown in FIG. 5. When a light L1 enters the film in the oblique direction with respect to the surface of the film, the light passing through the film is subjected to total reflection on the surface of the mirror 18 to pass through the film 19 as a reflected light L2 again. This results in the light being subjected to polarization twice, and the Faraday rotation is increased twice.

The CdMnTe film prepared by the ICB deposition is varied in dispersion spectra of Faraday rotation depending upon the ionization, acceleration voltage and the like.

Figure 6:
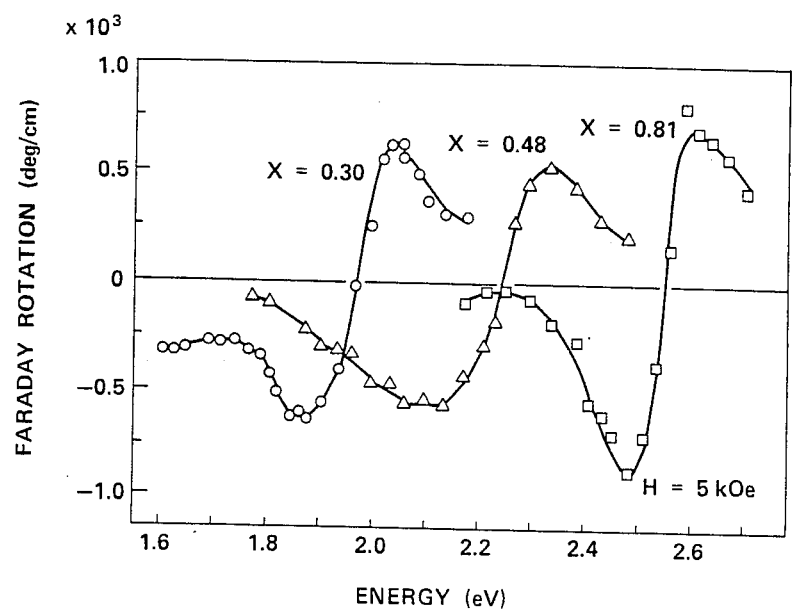
FIG. 6 is a graphical representation showing the dispersion spectra of Faraday rotation.
Figure 7:
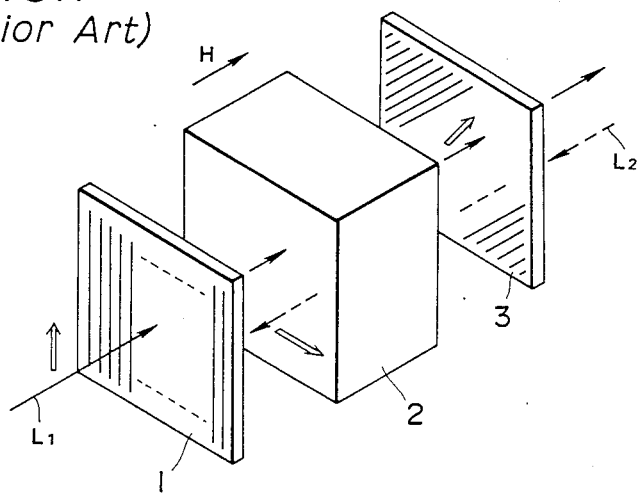
FIG. 7 is a perspective view showing a conventional optical isolator.

FIG. 6 shows the dispersion spectra of Faraday rotation of $Cd_{1-x}Mn_xTe$ films prepared at different acceleration voltages and different composition ratios x.

As is apparent from FIG. 6, an increase in composition ratio x causes the dispersion spectra to be shifted to a high energy side corresponding to an increase in optical band gap.

The utilization of such characteristics renders the preparation of a light modulator or optical wave detector possible, when the $Cd_{1-x}Mn_xTe$ film is deposited on a glass substrate and the composition ratio is determined to correspond to dispersion spectra required.

More particularly, this allows characteristics that the Faraday rotation is rapidly varied from (−) to (+) with respect to transmission wavelength of a light as shown in FIGS. 4 or 6 to be obtained.

In this instance, it is a matter of course that the central frequency required is selected by varying the composition ratio x.

Also, the present invention can provide an automatic frequency controller (AFC) by feed-backing a signal after the passage through a polarizing plate to a light source, for example, a laser.

Further, in accordance with the present invention, an optical switch may be provided by separating the Faraday rotation on the (+) side and that on the (−) side from each other.

In addition, the present invention can provide an optical band-pass filter by combining a plurality of $Cd_{1-x}Mn_xTe$ films in which the x values are different from one another. Also, a band-pass filter may be formed by arranging the films thus formed on a single substrate in a multilayered manner to prepare a multilayered film in which the x values are continuously or intermittently varied.

Furthermore, a plurality of $Cd_{1-x}Mn_xTe$ films different in x from one another may be planely arranged on a single substrate. Such arrangement provides a plane waveguide path.

Moreover, the optical control element of the present invention is applicable to various elements other than the above-described elements. For example, it may provide a Faraday rotation element without requiring any external magnetic field by depositing the CdMnTe film on a substrate formed of a magnetic material.

As can be seen from the foregoing, the optical control element of the present invention is formed by depositing the $Cd_{1-x}Mn_xTe$ film on the substrate exhibiting both an optical function and a magnetic function, resulting in the structure being highly simplified. Also, such arrangement allows the control element to be small-sized and lightened. Further, the present invention uses the film of $Cd_{1-x}Mn_xTe$ which accomplishes the highly large Faraday rotation, thus, it exhibits a high performance sufficient to be conveniently used for a light communication system, an optical data processing apparatus and the like.

While a preferred embodiment of the invention has been described with a certain degree of particularity with reference to the drawings, obvious modifications and variations are possible in the light of the above teachings. It is therefore to be understood that within the scope of the appended claims, the invention may be practiced otherwise than as specifically described.

What is claimed as new and desired to be secured by letters patent of the United States is:

1. An optical control element comprising a substrate and a $Cd_{1-x}Mn_xTe$ ($0.01 \leq x \leq 0.99$) film directly formed on said substrate and having a (111) axis preferentially oriented in a direction perpendicular to the substrate.

2. The optical control element as defined in claim 1, wherein said substrate comprises a polarizing plate.

3. The optical control element as defined in claim 1, wherein said substrate comprises a reflecting mirror.

4. The optical control element as defined in claim 1, wherein said substrate has light-permeability.

5. An optical control element comprising a substrate and a plurality of multilayered $Cd_{1-x}Mn_xTe$ ($0.01 \leq x \leq 0.99$) films and each having a (111) axis preferentially oriented in a direction perpendicular to the substrate, wherein the x values in said respective films are different from one another.

6. An optical control element comprising a substrate and a plurality of $Cd_{1-x}Mn_xTe$ ($0.01 \leq x \leq 0.99$) films planely arranged on said substate and each having a (111) axis preferentially oriented in a direction perpendicular to the substrate, wherein the x values in said respective films are different from one another.

* * * * *